(12) United States Patent
Oishi et al.

(10) Patent No.: US 8,136,648 B2
(45) Date of Patent: Mar. 20, 2012

(54) CLUTCH OPERATION ASSISTING DEVICE, POWER UNIT FOR VEHICLE AND STRADDLE TYPE VEHICLE INCLUDING THE SAME

(75) Inventors: Akifumi Oishi, Shizuoka (JP); Takuji Murayama, Shizuoka (JP)

(73) Assignee: Yamaha Hatsudoki Kabushiki Kaisha, Iwata-Shi (JP)

(*) Notice: Subject to any disclaimer, the term of this patent is extended or adjusted under 35 U.S.C. 154(b) by 685 days.

(21) Appl. No.: 12/255,546

(22) Filed: Oct. 21, 2008

(65) Prior Publication Data
US 2009/0107797 A1   Apr. 30, 2009

(30) Foreign Application Priority Data

Oct. 26, 2007 (JP) ................................ 2007-278621
Jan. 8, 2008 (JP) ................................ 2008-001582

(51) Int. Cl.
*F16D 23/12* (2006.01)
*B60K 23/02* (2006.01)

(52) U.S. Cl. .................................. 192/70.23; 192/89.21
(58) Field of Classification Search ............... 192/70.23, 192/89.21
See application file for complete search history.

(56) References Cited

U.S. PATENT DOCUMENTS

| 6,328,147 B1* | 12/2001 | Fujita | 192/70.23 |
| 2005/0252748 A1* | 11/2005 | Oishi et al. | 192/99 S |
| 2008/0011575 A1* | 1/2008 | Oishi | 192/93 A |

FOREIGN PATENT DOCUMENTS

| JP | 55-094028 A | 7/1980 |
| JP | 07-132872 A | 5/1995 |

* cited by examiner

Primary Examiner — Richard M. Lorence
(74) Attorney, Agent, or Firm — Rabin & Berdo, PC

(57) ABSTRACT

A downsized power unit equipped with a clutch operation-assisting device that reduces operation force of a clutch lever. The clutch operation-assisting device includes a push shaft and a first rotation plate that is rotatably supported by a support plate and connected to a clutch wire, and slides the push shaft by rotation. The first rotation plate and a second rotation plate are connected by gear. The second rotation plate is rotatably supported by a bearing member fixed to the support plate. A spring unit that provides assisting force in a direction to disengage a friction clutch is connected to the second rotation plate by pin. The spring unit, as seen from a shaft direction of the push shaft, is disposed so that an extension direction of an auxiliary spring does not pass through a rotation center of a pressure plate.

12 Claims, 9 Drawing Sheets

CLUTCH OPERATION ASSISTING DEVICE, POWER UNIT FOR VEHICLE AND STRADDLE TYPE VEHICLE INCLUDING THE SAME

CROSS REFERENCE TO RELATED APPLICATIONS

This application claims the benefit of priority under 35 USC 119 of Japanese patent application no. 2007-278621, filed on Oct. 26, 2007, and Japanese patent application no. 2008-001582, which are incorporated by reference.

BACKGROUND OF THE INVENTION

1. Field of the Invention

The present invention relates to a clutch operation-assisting device for a straddle type vehicle that reduces the operation force of a friction clutch when the torque transmission is disengaged by the friction clutch.

2. Description of Related Art

A power unit for a motorcycle that includes a friction clutch for engaging and disengaging torque from an engine to a transmission is known. The friction clutch has a clutch shaft, and a friction plate and a clutch plate that contact each other in the shaft direction of the clutch shaft (clutch shaft direction). The friction clutch also includes a pressure plate that engages the friction plate and the clutch plate, and a clutch spring that urges the pressure plate. Under normal conditions, the friction clutch is maintained in a clutch-in state that allows torque transmission by the clutch spring.

The friction clutch has a clutch release mechanism that releases pressure on the pressure plate caused by the clutch spring. The clutch release mechanism is connected to a clutch lever through a clutch wire. Therefore, when a rider grasps the clutch lever, the pressure plate slides against the urging force of the clutch spring, and torque transmission from the friction plate to the clutch plate is disengaged.

In a friction clutch used in a high-powered and high-speed type engine, it is desirable to set an attachment load of the clutch spring high in order to increase torque capacity. However, since the clutch lever operation is performed by human hand, if the attachment load of the clutch spring is set high, the burden of operating the clutch lever is increased.

As a means to solve this, a clutch operation-assisting device that has an assist mechanism for reducing operation force of the clutch lever in a clutch release mechanism to which the clutch wire is connected has been proposed (for example, refer to JP-A-Hei 7-132872 and JP-A-Sho 55-94028).

The clutch operation-assisting device of JP-A-Hei 7-132872 is disposed at the outside of the power unit. However, there are reasons that the clutch operation-assisting device should be disposed at the inside of the power unit. In JP-A-Sho 55-94028, the clutch operation-assisting device is disposed at the inside of the power unit.

As shown in FIG. 9, the clutch operation-assisting device of JP-A-Sho 55-94028 includes a rotatable push lever 525 connected to a clutch wire 528, and an assisting spring 529 that reduces the operation force of the clutch lever. One end 529a of assisting spring 529 is connected to push lever 525, and the other end of assisting spring 529 is connected to a communication member 531 formed in an arc shape. Push lever 525 is fixed to a push screw 517 located on the same straight line (on a straight line extending in a direction from the face to the reverse side of paper of FIG. 9) as the clutch shaft. Push lever 525 rotates together with push screw 517. On the other hand, communication member 531 is rotatably supported to a pin 530, and rotates about pin 530.

When the clutch lever is in a so-called play state (a state where no load is applied when the clutch lever is pulled), assisting spring 529 locates on a straight line M1 that connects a rotation center CO of push lever 525 and pin 530, as shown in FIG. 9. In other words, the extension direction passes through rotation center CO of push lever 525. Therefore, the urging force of assisting spring 529 does not function to rotate push lever 525.

On the other hand, as indicated by a chain double-dashed line in FIG. 9, when the clutch lever is pulled, push lever 525 is dragged and rotates counterclockwise. As a result, the position of assisting spring 529 changes, and extension direction M2 of assisting spring 529 deviates from rotation center CO of push lever 525. Accordingly, a part of the urging force of assisting spring 529 functions to rotate push lever 525 counterclockwise. Therefore, the urging force of assisting spring 529 functions as an assisting force in pulling the clutch lever, and operation force of the clutch lever is reduced.

In this way, in the clutch operation-assisting device described above, assisting spring 529 changes the position as it transitions from the initial position where the clutch lever is in a play state to the disengagement position where the friction clutch is disengaged. In the initial location, extension direction M1 of assisting spring 529 passes through a shaft center (rotation center CO) of push screw 517. Therefore, assisting spring 529 must be disposed along the radial direction from the shaft center of push screw 517, and it is difficult to sufficiently maintain an installation space for assisting spring 529. Also, it is difficult to sufficiently maintain the extension length of assisting spring 529. Therefore, the power unit must be upsized in order to sufficiently maintain installation space for assisting spring 529.

SUMMARY OF THE INVENTION

The present invention addresses these issues and provides a downsized power unit that has a built-in clutch operation-assisting device.

A clutch operation-assisting device according to this invention is disposed in a clutch operation device and is housed in a casing of a power unit. The clutch operation device includes a friction clutch having a pressure plate and a clutch spring that urges the pressure plate, and that is arranged in the casing of the power unit. An operation element is connected to the friction clutch through a transmission member, and is manually operated against the urging force of the clutch spring when torque transmission by the friction clutch is disengaged. The clutch operation-assisting device includes a sliding member that rotatably supports the pressure plate and slides in a predetermined direction together with the pressure plate. A first rotation member is connected to the transmission member and slides the sliding member by rotating along with the transmission member. A support plate rotatably supports the first rotation member. An auxiliary elastic member changes an expansion direction and provides urging force to rotate the first rotation member in a direction that disengages the friction clutch, when the operation element is operated in a direction that disengages the friction clutch, while the operation element shifts from a disengagement starting position where the operation element receives counter force of the clutch spring to a disengagement position where disengagement of the friction clutch is completed. The second rotation member is connected to the auxiliary elastic member and connected to the first rotation member, and transmits urging force of the auxiliary elastic member to the first rotation member by rotation. A bearing member is fixed to or integrally formed in the support plate, and rotatably supports the second rotation member. An expansion direction of the auxiliary elastic member does not pass through a rotation center of the pressure plate, as seen from a sliding direction of the sliding member.

According to the clutch operation-assisting device described above, the expansion direction of the auxiliary elastic member does not pass through the rotation center of the pressure plate as seen from the sliding direction of the sliding member. Therefore, the auxiliary elastic member need not be disposed along the radial direction from the rotation center of the pressure plate, as seen from the sliding direction. Therefore, the auxiliary elastic member can be disposed without restriction of the sliding member. Thus, installation space for the auxiliary elastic member is largely maintained without upsizing the power unit itself. Also, space for the auxiliary elastic member to expand or contract is largely maintained. As a result, the power unit can be downsized.

According to the clutch operation-assisting device described above, the second rotation member is fixed to the support plate or supported by the integrated bearing member. Therefore, the second rotation member is stably supported. Also, positioning accuracy for installing the second rotation member is improved. Therefore, transmission of force from the auxiliary elastic member through the second rotation member to the first rotation member goes smoothly, and operation of the operation element by an operator goes smoothly.

As described above, according to the present invention, a power unit that has a built-in clutch operation-assisting device can be downsized.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Embodiments of the present invention are now described in detail with reference to the drawings.

Figure 1:
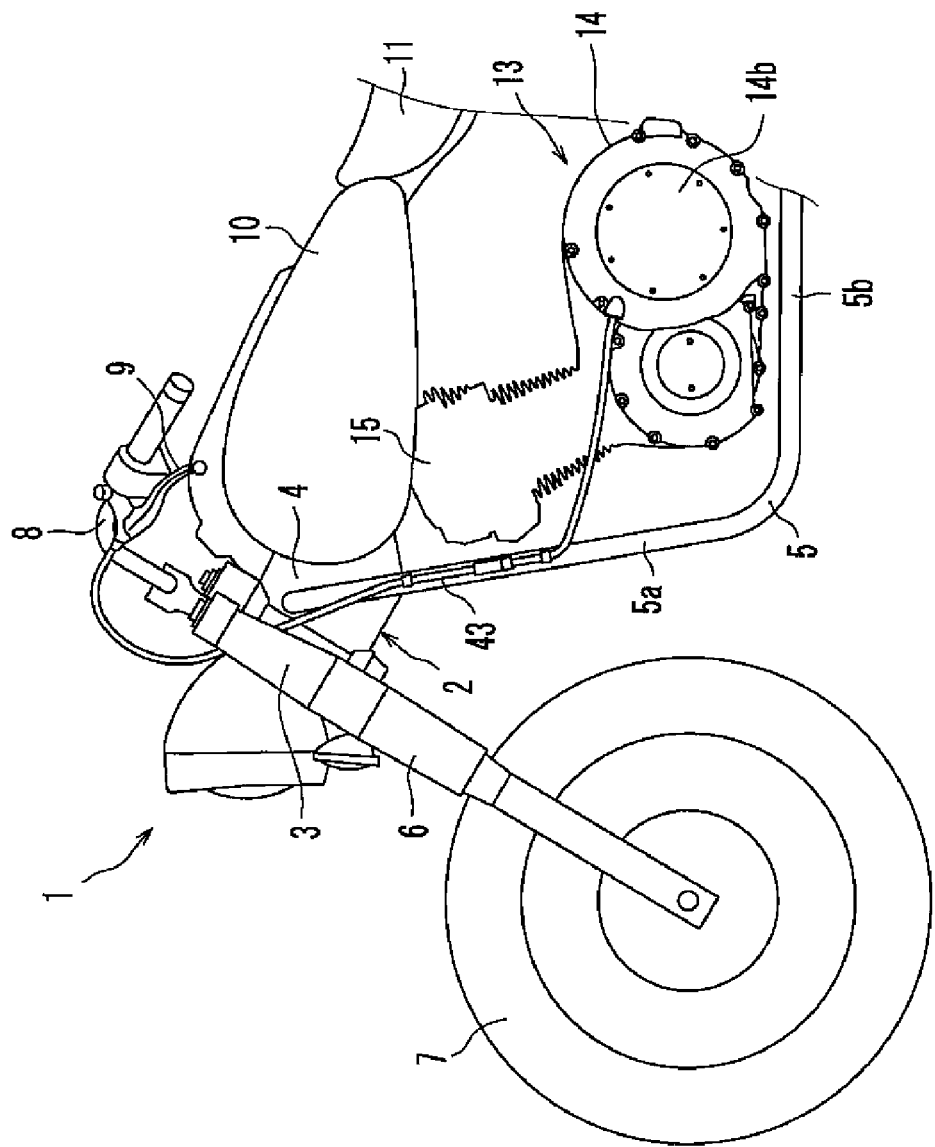
FIG. 1 is a left side view of a portion of a motorcycle according to the present invention.

Motorcycle 1 of FIG. 1 includes a frame 2 having a steering head pipe 3, a mainframe member 4 and a down tube 5. Steering head pipe 3 supports a front fork 6. A steering handle 8 that steers a front wheel 7 is fixed on the upper end of front fork 6. Clutch lever 9 as an example of an operation element is attached to the left end part of steering handle 8.

Main frame member 4 extends backwards from steering head pipe 3, and supports a fuel tank 10 and a seat 11. Down tube 5 has a first portion 5a that extends downwards from the front end of main frame member 4 and a second portion 5b that extends backwards from the lower end of first portion 5a.

A power unit 13 is supported by frame 2 and has a crankcase 14 and a cylinder 15. Friction clutch 30 (FIG. 2) is housed in crankcase 14. Clutch lever 9 and friction clutch 30 are connected through clutch wire 43. Clutch lever 9, clutch wire 43 and friction clutch 30 constitute a clutch operation device that manually engages or disengages the transmission of torque in power unit 13.

Figure 2:
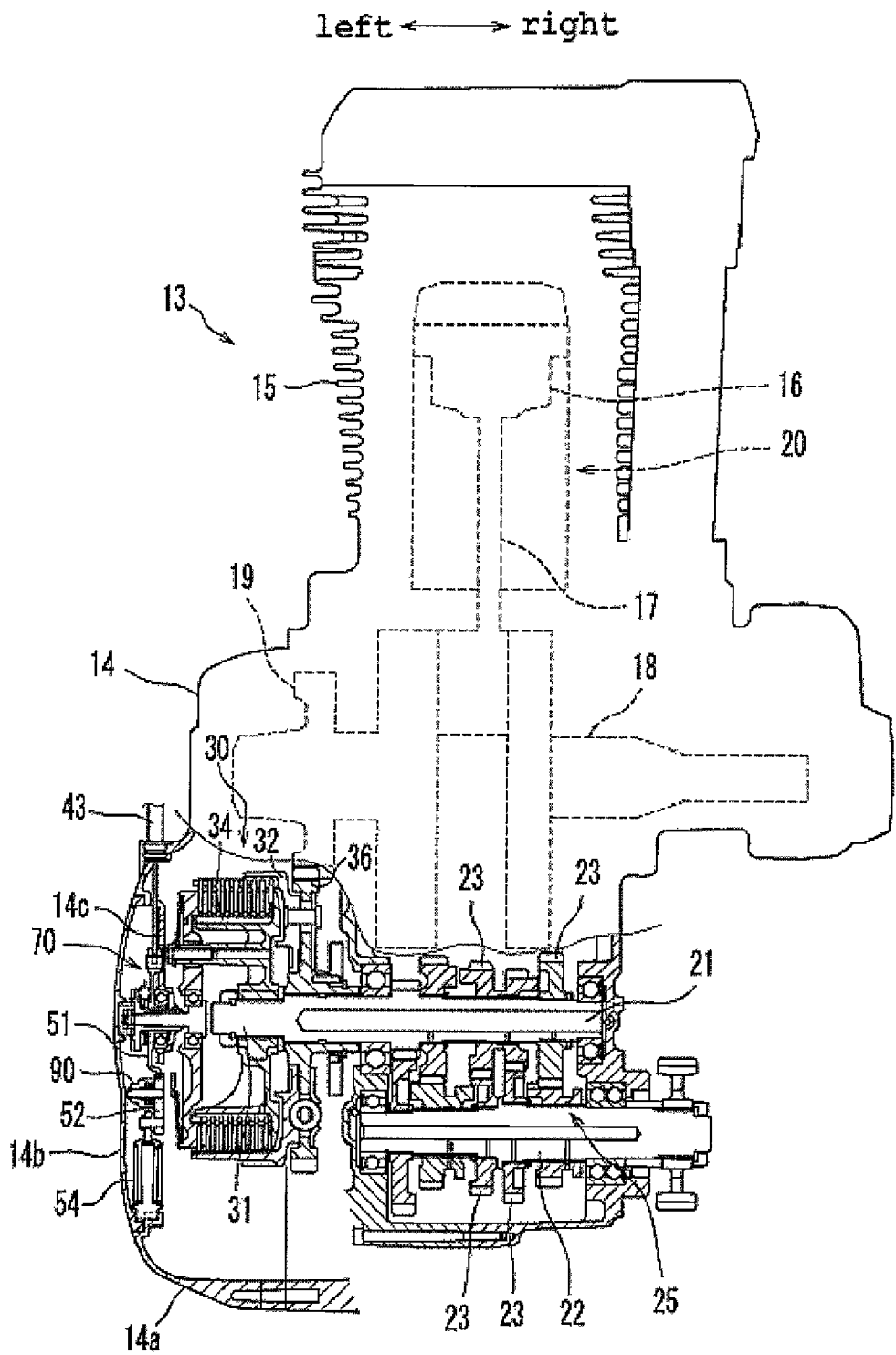
FIG. 2 is a sectional view of a portion of a power unit in a cut-across way according to the present invention.

As shown in FIG. 2, engine 20 is disposed in power unit 13. Engine 20 includes a piston 16, a crankshaft 18 and a connecting rod 17 that connects piston 16 and crankshaft 18. A main shaft 21 and a drive shaft 22 are arranged in parallel with crankshaft 18 in crankcase 14. A plurality of gears 23 are disposed around main shaft 21 and drive shaft 22. Transmission 25 is formed by main shaft 21, drive shaft 22 and gear 23.

Friction clutch 30 is disposed at the left end of main shaft 21. Hereinafter, the portion of main shaft 21 where friction clutch 30 is disposed is referred to as clutch shaft 31. In this embodiment, clutch shaft 31 is part of main shaft 21. Clutch shaft 31 and main shaft 21 are formed integrally.

Figure 3:
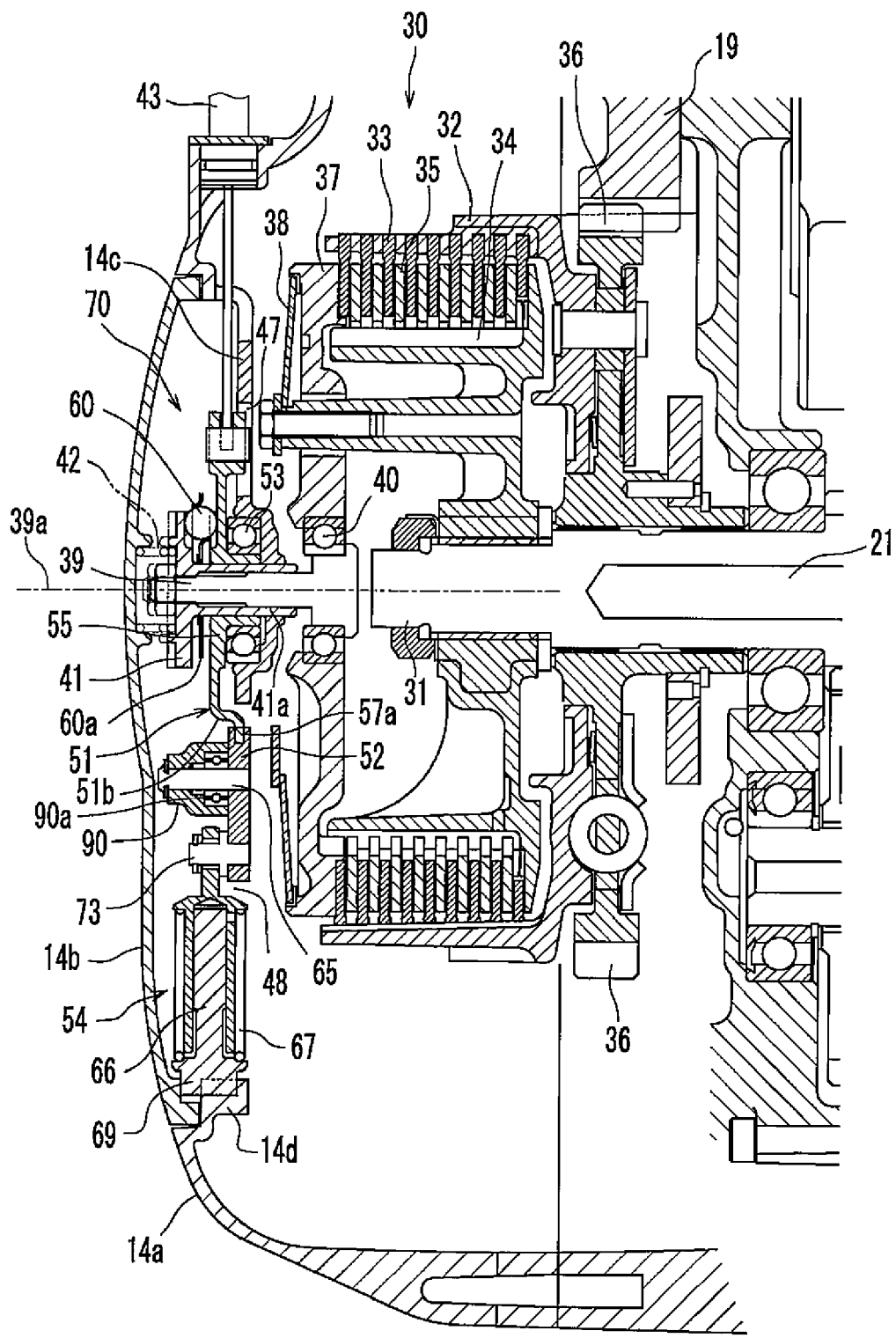
FIG. 3 is a sectional view of a clutch operation-assisting device according to the present invention.

As shown in FIG. 3, friction clutch 30 in this embodiment is a wet multi plate type friction clutch. However, the present invention is not limited to a friction clutch of a wet multi plate type. Friction clutch 30 includes a clutch housing 32 and a clutch boss 34. Clutch housing 32 is rotatably supported by clutch shaft 31. Clutch boss 34 is supported by and rotates together with clutch shaft 31.

A plurality of friction plates 33 are disposed in clutch housing 32, and a plurality of clutch plates 35 are disposed at clutch boss 34. Friction plates 33 and clutch plates 35 are arranged alternately along the shaft direction (right and left direction) of clutch shaft 31.

As shown in FIG. 2, a drive gear 19 is fixed to the left end of crankshaft 18. A driven gear 36 is fixed to clutch housing 32. Drive gear 19 and driven gear 36 are engaged, and driven gear 36 rotates in accordance with drive gear 19. Therefore, clutch housing 32 rotates in accordance with crankshaft 18. Drive gear 19 and driven gear 36 constitute a speed reduction mechanism.

As shown in FIG. 3, pressure plate 37 is disposed at the left side of clutch shaft 31. A clutch spring 38 made with a diaphragm spring is attached to pressure plate 37. Clutch spring 38 is not limited to a specific kind. Pressure plate 37 is slidable in the shaft direction of clutch shaft 31, and urged to the clutch boss 34 side (right side in FIG. 3) at all times by clutch spring 38. When pressure plate 37 moves to the clutch boss 34 side and presses friction plate 33, friction plate 33 and clutch plate 35 are press-fit, and friction clutch 30 is set in an engagement (clutch-in) state. On the other hand, when pressure plate 37 separates from clutch boss 34, engagement between friction plate 33 and clutch plate 35 is released, and friction clutch 30 is set in a disengagement (clutch-out) state.

Crankcase 14 includes a case body 14a that has support plate 14c, and a clutch cover 14b. Support plate 14c is arranged at the outside (left side) of pressure plate 37. Clutch cover 14b is arranged at the outside of support plate 14c.

Clutch cover 14b covers support plate 14c and friction clutch 30 from the outside. Clutch cover 14b also covers clutch operation-assisting device 70.

A push shaft 39 is supported by support plate 14c. Push shaft 39 is arranged on the same straight line as clutch shaft 31, and is arranged further outside (left side) of clutch shaft 31. Pressure plate 37 is rotatably supported by push shaft 39 through a bearing 40. Pressure plate 37 is unable to move in the shaft direction against push shaft 39, but slides in the shaft direction in accordance with push shaft 39. Phantom line 39a in FIG. 3 is a rotation center line of push shaft 39 and is also a rotation center line of pressure plate 37.

A cam plate 41 is attached to the left end of push shaft 39. In this embodiment, push shaft 39 and cam plate 41 are formed by different members. However, push shaft 39 and cam plate 41 may be formed integrally. That is, part of push shaft 39 may form cam plate 41. In the present embodiment, cam plate 41 has a boss part 41a, and push shaft 39 is fit to boss part 41a. A compression coil spring 42 is arranged between the left side of cam plate 41 and clutch cover 14b. Cam plate 41 is constantly urged in the right direction by compression coil spring 42. However, compression coil spring 42 is not necessarily required. Cam plate 41, ball 60 and first rotation plate 51 constitute a so-called cam mechanism of ball cam type. Compression coil spring 42, which urges cam plate 41 in the right direction, is not necessary as long as it functions as a cam mechanism.

Boss part 41a of cam plate 41 passes through a center hole of a first rotation plate 51. Boss part 41a of cam plate 41 can move in the shaft direction in relation to first rotation plate 51. First rotation plate 51 is rotatably supported by support plate 14c through a bearing 53.

Figure 4A:
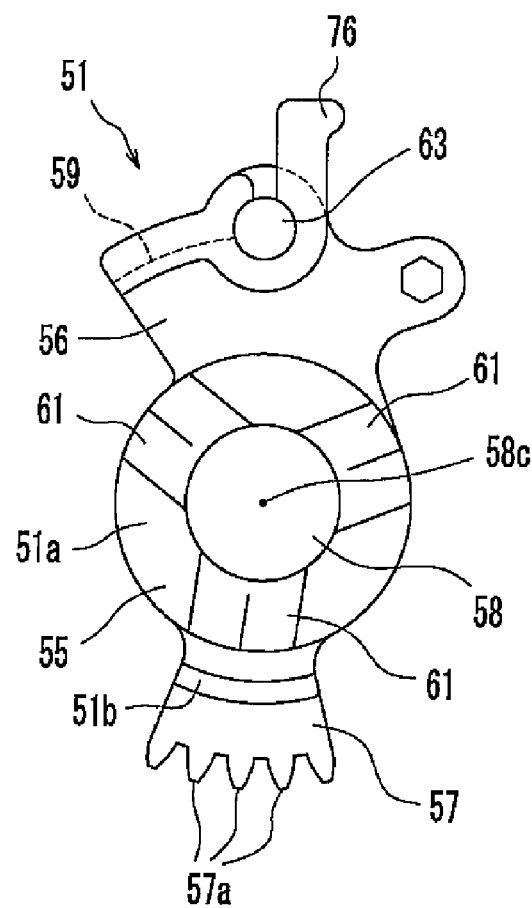
FIG. 4(a) is a front view of a first rotation plate according to the present invention.
Figure 4B:
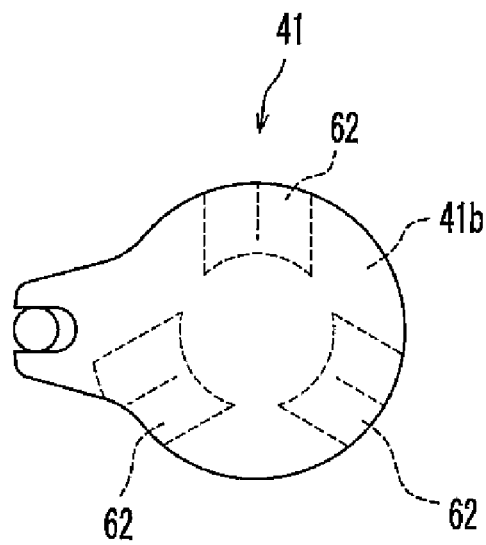
FIG. 4(b) is a front view of a cam plate according to the present invention.

As shown in FIG. 4(a), three cam grooves 61 are arranged on the periphery of the surface 51a (left side surface in FIG. 3) of first rotation plate 51. On the other hand, as shown in FIG. 4(b), similar cam grooves 62 are formed in the back surface 41b (right side surface in FIG. 3) of cam plate 41. Cam grooves 61, 62 are generally in a V shape in cross section. As shown in FIG. 3, a ball 60 is arranged between cam groove 61 of first rotation plate 51 and cam groove 62 of cam plate 41. A plate 60a prevents ball 60 from dropping out. A so-called ball cam type of cam mechanism is formed by cam grooves 61, 62 and ball 60. That is, when first rotation plate 51 rotates, ball 60 moves in cam grooves 61, 62, and then cam plate 41 is pushed out to the left side by ball 60. As a result, pressure plate 37 slides to the left side together with push shaft 39, and friction clutch 30 is set in a disengagement state.

Figure 5A:
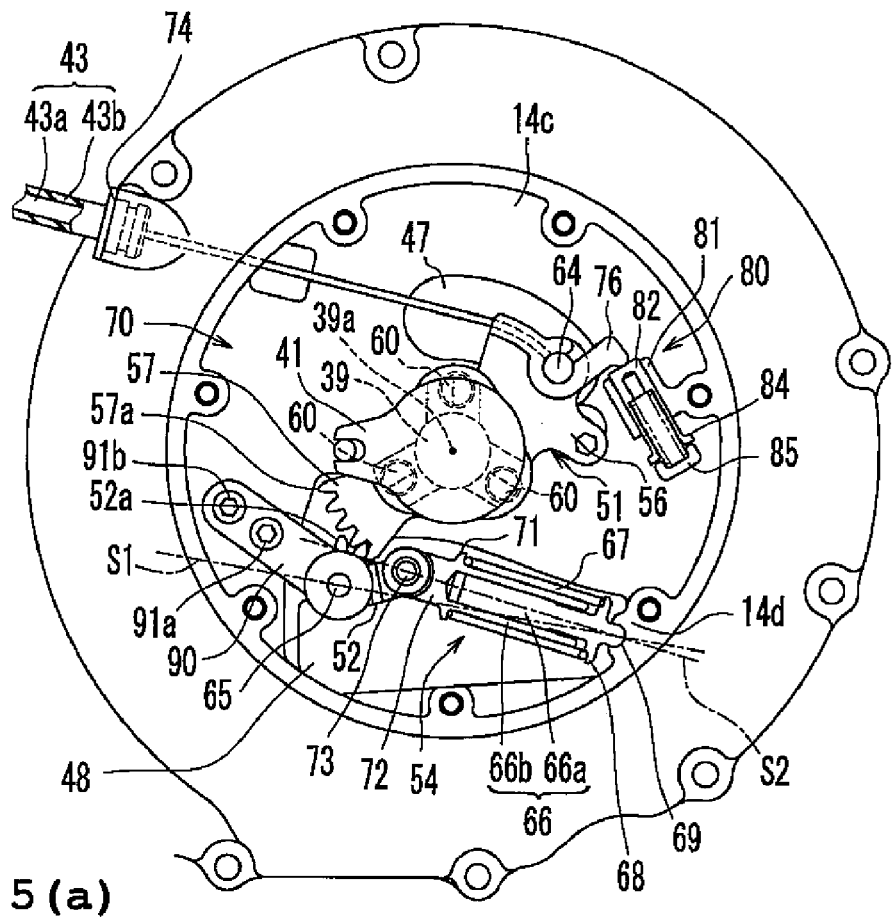
FIG. 5(a) is a side view and FIG. 5(b) is a sectional view of a clutch operation-assisting device according to the present invention while a clutch lever is in a returning position.

As shown in FIG. 5(a), clutch wire 43 includes an inner wire 43a made of metal, and an outer tube 43b made of synthetic resin that covers inner wire 43a. Inner wire 43a is slidably inserted in outer tube 43b, and is pulled out from the edge part of outer tube 43b.

Clutch operation-assisting device 70 includes a second rotation plate 52 and a spring unit 54, in addition to first rotation plate 51. First rotation plate 51 may be constituted by a sheet metal press process part, for example. As shown in FIG. 4(a), first rotation plate 51 includes a center part 55 of a generally circular shape, a wire connection part 56 and a gear part 57. Wire connection part 56 and gear part 57 are located on opposite sides with center part 55 in between. As shown in FIG. 3 and FIG. 4(a), first rotation plate 51 is bent toward the inside in the clutch shaft direction (right side in FIG. 3) at a place 51b between center part 55 and gear part 57.

A hole 58, through which push shaft 39 is inserted, is formed at center part 55. Cam groove 61 is arranged on the periphery of hole 58 of center part 55. An engagement groove 59 and an engagement hole 63 are formed at wire connection part 56. Engagement groove 59 is a portion around which inner wire 43a of clutch wire 43 is wound. Engagement groove 59 curves like a circle whose center is center 58c of hole 58. Engagement groove 59 is formed generally in a U shape in cross section, which opens upwards. As shown in FIG. 5(a), an engagement element 64 in the shape of a column, which is fixed at the tip of inner wire 43a, is hooked into engagement hole 63. When inner wire 43a is pulled, first rotation plate 51 rotates counterclockwise around push shaft 39 as the center.

Figure 5B:
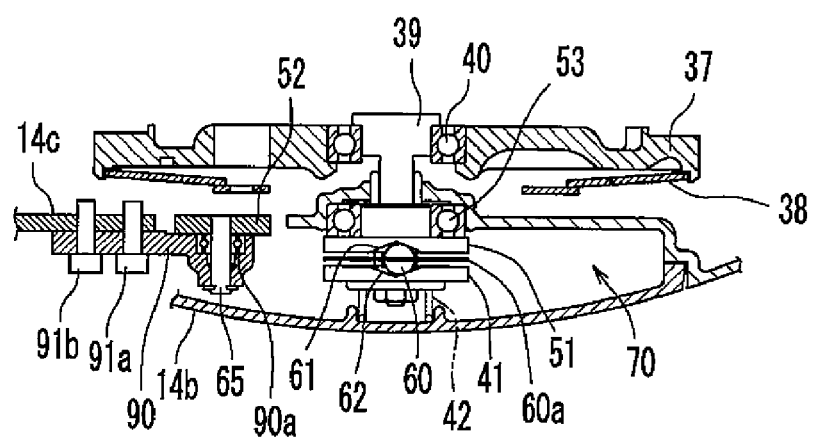

As shown in FIG. 5(b), a bearing member 90 is fixed to support plate 14c. The fixing method for bearing member 90 is not limited specifically. However, in the present embodiment, bearing member 90 is fixed to support plate 14c by bolts 91a, 91b. Instead of bolts 91a, 91b, fasters such as screws may be used, of course. Bearing member 90 may be fixed to support plate 14c by jointing. Bearing member 90 may be formed integrally on support plate 14c. That is, bearing member 90 may be a separate unit from support plate 14c, or may be formed with support plate 14c as a single unit. Bearing member 90 supports second rotation plate 52. Second rotation plate 52 rotates about a pivot shaft 65 that is a rotation center of bearing member 90.

As shown in FIG. 5(a), teeth 52 are formed on second rotation plate 52. Teeth 52a of second rotation plate 52 are engaged with teeth 57a of gear part 57 of first rotation plate 51. First rotation plate 51 and second rotation plate 52 are connected to transmit the torque from one to another by teeth 52a, 57a. Therefore, second rotation plate 52 rotates in accordance with first rotation plate 51 (FIG. 5(a)).

Bearing member 90 includes a bearing 90a that is made in one embodiment with a ball bearing. However, bearing 90a of bearing member 90 does not have to be a ball bearing and may be any type of roller bearing. The shape and structure are not limited to a roller bearing, as long as the mechanism allows the rotation of second rotation plate 52 that has pivot shaft 65 as a rotation center.

The distance between the rotation center (shaft center 39a of push shaft 39) of first rotation plate 51 and teeth 57a is longer than the distance between the rotation center (shaft center of pivot shaft 65) of second rotation plate 52 and teeth 52a. Therefore, first rotation plate 51 and second rotation plate 52 are connected in a way that a turning angle of second rotation plate 52 is larger than a turning angle of first rotation plate 51.

Spring unit 54 includes a spring holder 66 and an auxiliary spring 67. Spring holder 66 is constituted by an inner tube 66a and an outer tube 66b. Inner tube 66a and outer tube 66b are slidably fit in the shaft direction. Outer tube 66b slides in relation to inner tube 66a so that spring holder 66 can be stretched, compressed or contracted.

Inner tube 66a has a spring retainer 68 and a support end 69. Spring retainer 68 juts out in the shape of a flange from an outer peripheral surface of one end of inner tube 66a. Support end 69 is formed at one end of inner tube 66a, and rotatably supported by a mounting seat 14d of support plate 14c.

Outer tube 66b has spring retainer 71 and a connection end 72. Spring retainer 71 juts out in the shape of a flange from an outer peripheral surface of one end of outer tube 66b. Connection end 72 is formed at one end of outer tube 66b, and rotatably connected to one end of second rotation plate 52 through a pin 73.

Auxiliary spring 67 is a compression coil spring that is set between spring retainer 68 of inner tube 66a and spring retainer 71 of outer tube 66b, in a compressed state. Therefore, spring holder 66 is urged in the extending direction at all times. Auxiliary spring 67 changes extension direction S2 with support end 69 as a pivot while shifting from a returning position (FIG. 5(*a*)) through a disengagement starting position (FIG. 6(*a*)) to a disengagement position (FIG. 7(*a*)), which are described later. However, extension direction S2 of auxiliary spring 67 and shaft center 39*a* of push shaft 39 do not cross at any place, as seen from the shaft direction of push shaft 39.

A wire introduction port 74 is formed at case body 14*a* of crankcase 14. Clutch wire 43 is inserted in wire introduction port 74. Inner wire 43*a* of clutch wire 43 is introduced in crankcase 14 through wire introduction port 74, and connected to wire connection part 56 of first rotation plate 51.

Support plate 14*c* is provided with a first hole 47 and a second hole 48, in addition to a hole to which push shaft 39 is inserted. Holes 47 and 48 are located opposite from each other with shaft center 39*a* of push shaft 39 in between. Part of wire connection part 56 of first rotation plate 51 is located in first hole 47 (FIG. 3). Part of second rotation plate 52 and spring unit 54 are located in second hole 48 (FIG. 3).

Clutch lever 9 can rotate between the returning position where friction clutch 30 maintains a clutch-in state and the disengagement position where friction clutch 30 is set clutch-off. A predetermined rotation range from the returning position (for example, a rotation range where the moving distance of the tip of clutch lever 9 is between 10 and 15 mm) is a so-called play region, in which a clutch-off state is maintained while clutch lever 9 is grasped. In the play region, operation of clutch lever 9 pulls clutch wire 43 only slightly so that urging force of clutch spring 38 is not transmitted to clutch lever 9. The very end of play of clutch lever 9 is the disengagement starting position. In the disengagement starting position, urging force of clutch spring 38 works on clutch lever 9 through clutch wire 43.

FIGS. 5(*a*) and (*b*) indicate a state of clutch operation-assisting device 70 where clutch lever 9 is in the returning position. When clutch lever 9 is in the returning position, pin 73 that connects second rotation plate 52 and spring unit 54 is deviated upwards of a straight line S1 that connects support end 69 of spring holder 66 and pivot shaft 65 of second rotation plate 52.

When the rider operates clutch lever 9 from the returning position to the disengagement starting position, first rotation plate 51 is pulled through clutch wire 43, and first rotation plate 51 rotates counterclockwise. First rotation plate 51 and second rotation plate 52 are connected by gear. Thus, second rotation plate 52 rotates clockwise. On the other hand, second rotation plate 52 and spring unit 54 are connected by a pin. Thus, spring unit 54 rotates counterclockwise around support end 69 as a pivot.

Figure 6A:
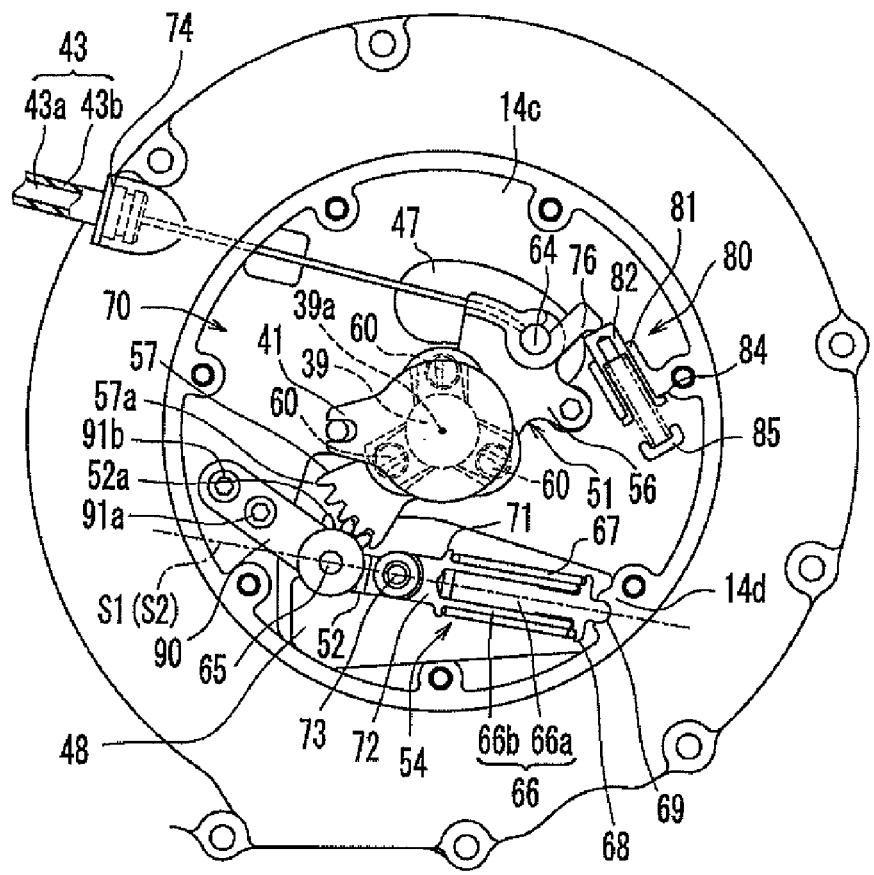
FIG. 6(a) is a side view and FIG. 6(b) is a sectional view of a clutch operation-assisting device according to the present invention while a clutch lever is in a disengagement starting position.
Figure 6B:
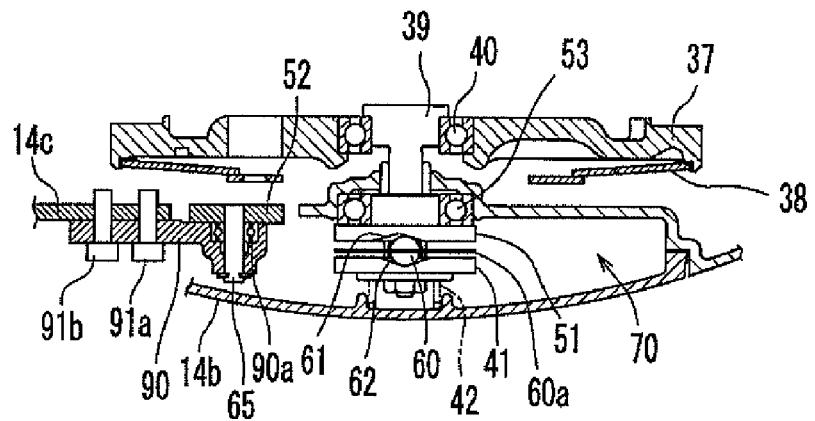

When clutch lever 9 reaches the disengagement starting position, as shown in FIG. 6(*a*), pin 73 is located on straight line S1 that connects support end 69 of spring holder 66 and pivot shaft 65 of second rotation plate 52. Therefore, urging force of auxiliary spring 67 does not function to rotate second rotation plate 52, nor does it work to rotate first rotation plate 51.

Figure 7A:
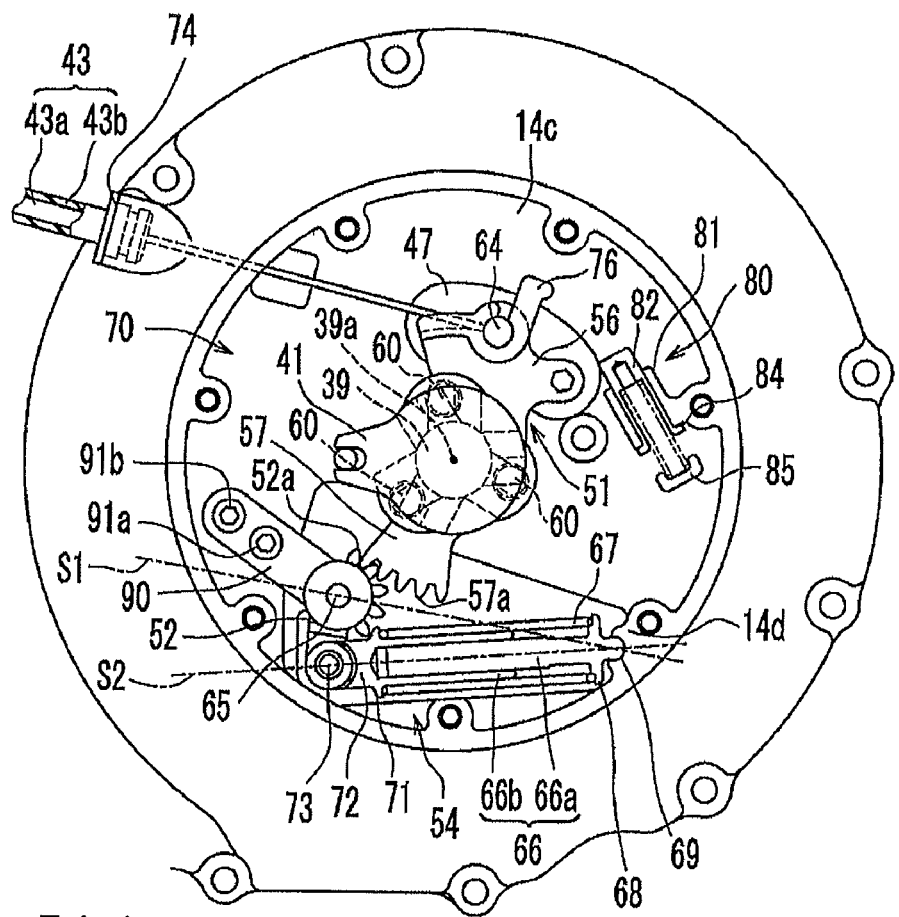
FIG. 7(a) is a side view and FIG. 7(b) is a sectional view of a clutch operation-assisting device according to the present invention while a clutch lever is in a disengagement position.
Figure 7B:
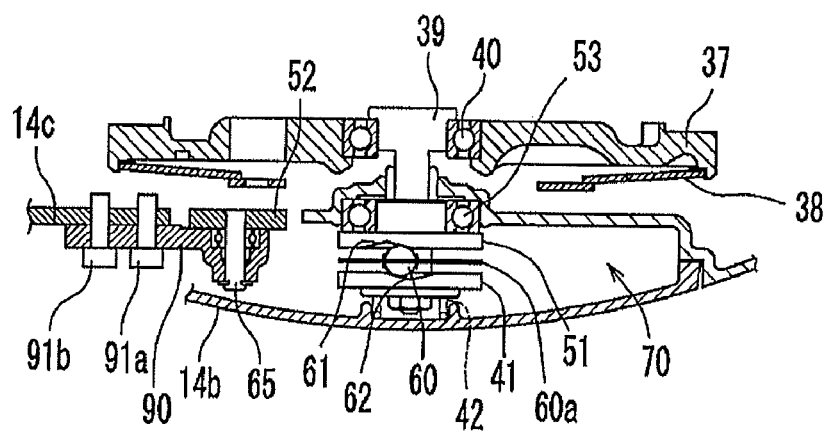

When clutch lever 9 is operated from the disengagement starting position to the disengagement position, first rotation plate 51 further rotates counterclockwise. Then, as shown in FIG. 7(*b*), the position between cam groove 61 of first rotation plate 51 and cam groove 62 of cam plate 41 is deviated. Accordingly, ball 60 moves in both cam grooves 61, 62, and cam plate 41 is pushed outside. As shown in FIG. 7(*a*), second rotation plate 52 further rotates clockwise in accordance with the rotation of first rotation plate 51, and the position of pin 73 deviates downwards of straight line S1. As a result, spring holder 66 extends by receiving the urging force of auxiliary spring 67, and the urging force of auxiliary spring 67 functions to rotate the second rotation plate in a clockwise direction. As a result, the urging force of auxiliary spring 67 functions as an assisting force to rotate first rotation plate 51 in counterclockwise direction.

Therefore, when clutch lever 9 is operated toward the disengagement position beyond the disengagement starting position, first rotation plate 51 is forcibly rotated counterclockwise by auxiliary spring 67. Therefore, urging force of auxiliary spring 67 is added to the operation force for the rider to grip on clutch lever 9. Therefore, the rider's load in operating clutch lever 9 is reduced.

As shown in FIG. 5(*a*), in a state where clutch lever 9 is in the returning position, the position of pin 73 is deviated upwards of straight line S1. Therefore, first rotation plate 51 is pressed in a clockwise direction, that is, a direction opposite to the direction that disengages friction clutch 30, by the urging force of auxiliary spring 67.

The force that urges first rotation plate 51 in a clockwise direction becomes an inverse assisting force that counterworks the force that rotates clutch lever 9 from the returning position to the disengagement starting position. Therefore, if it is left this way, the initial input load, which takes when the clutch is gripped for the first time, increases.

For this reason, a countervailing spring unit 80 that countervails the inverse assisting force is disposed in clutch operation-assisting device 70 in the present embodiment of the invention. In the present embodiment, a housing part 81 that houses countervailing spring unit 80 is formed in support plate 14*c*.

Figure 8:
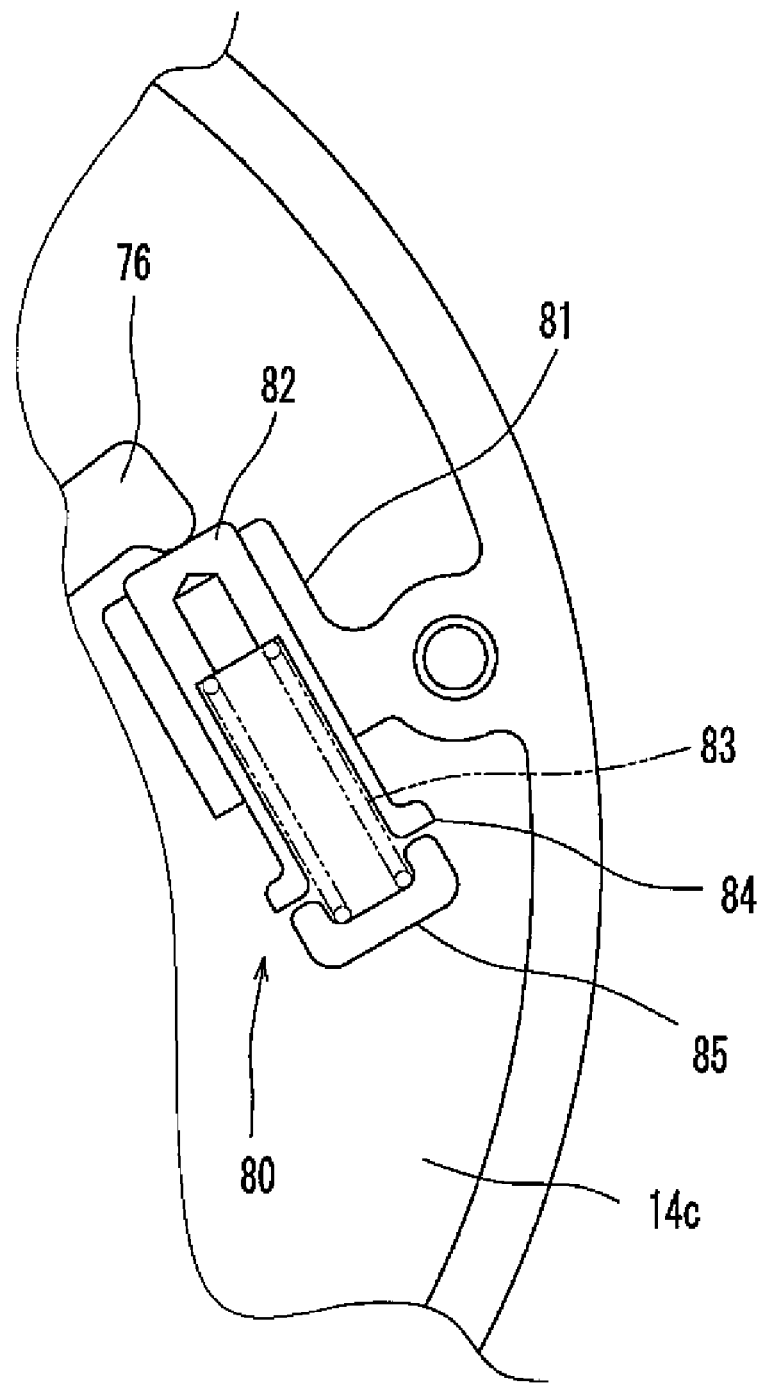
FIG. 8 is a side view of a countervailing spring unit in a clutch operation-assisting device according to the present invention while a clutch lever is in a returning position.
Figure 9:
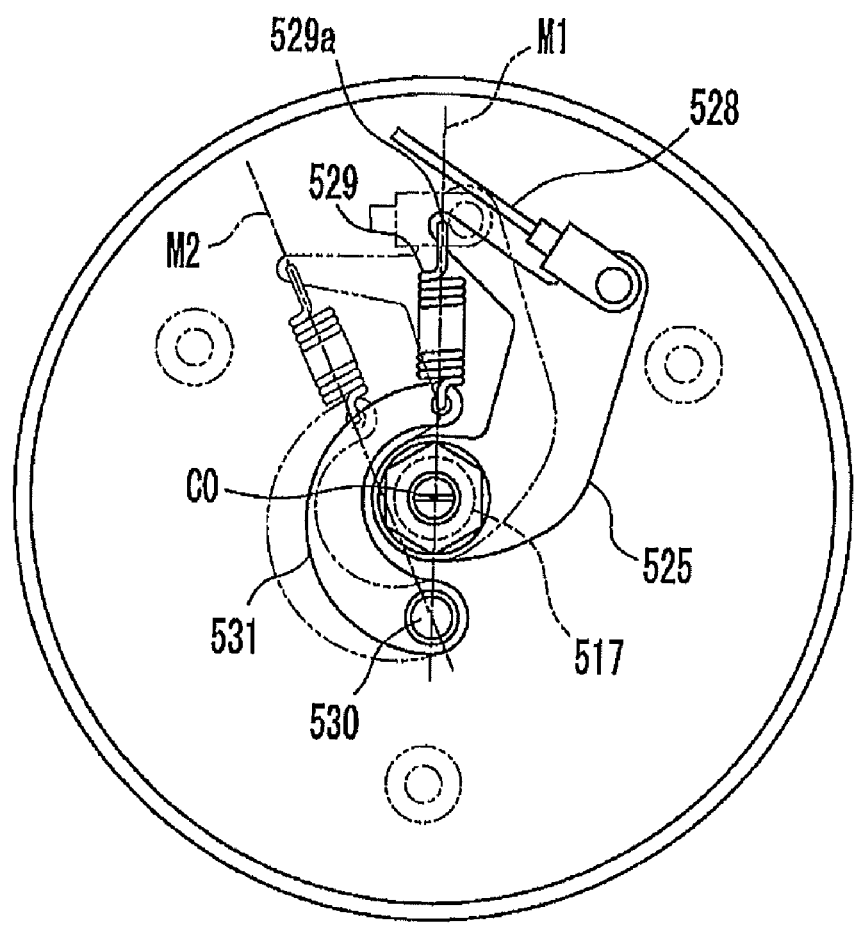
FIG. 9 is a side view of a clutch operation-assisting device of the related art.

As shown in FIG. 8, countervailing spring unit 80 has a pressing pin 82 and a countervailing spring 83. A flange-shape stopper 84 is formed at the bottom end of pressing pin 82. Pressing pin 82 is inserted in housing part 81 from below.

A spring retainer 85 that supports the bottom end of countervailing spring 83 is disposed in support plate 14*c*. Countervailing spring 83 is a compression coil spring, and is disposed between the upper-end-inner-surface of pressing pin 82 and spring retainer 85 in a compression state. Countervailing spring 83 continually urges the pressing pin 82 obliquely upwards along the longitudinal direction of housing part 81. The urging force of countervailing spring 83 is set slightly weaker than the inverse assisting force of auxiliary spring 67.

Pressing pin 82 can move between a first position (FIGS. 6(*a*) and 7(*a*)) where the upper end protrudes largely from housing part 81 and a second position (FIG. 5(*a*)) where the upper end of pressing pin 82 protrudes slightly from housing part 81. In the first position, a stopper 84 of pressing pin 82 collides with the lower end of housing part 81 to restrict a position of pressing pin 82. In the second position, stopper 84 of pressing pin 82 collides with spring retainer 85 to restrict a position of pressing pin 82.

While clutch lever 9 shifts from the returning position to the disengagement starting position, the upper end of pressing pin 82 collides with a contact part 76 of first rotation plate 51 (FIG. 5(*a*)). Therefore, first rotation plate 51 receives the urging force of countervailing spring 83. As a result, when clutch lever 9 is in a play region, the total urging force of auxiliary spring 67 and countervailing spring 83, which applies to first rotation plate 51, becomes almost zero. Thus, rotation of first rotation plate 51 in a clockwise direction is restricted.

When clutch lever 9 passes beyond the disengagement starting position and approaches the disengagement position, contact part 76 of first rotation plate 51 separates from the upper end of pressing pin 82 (FIG. 7(*a*)). As a result, the urging force of countervailing spring 83 applied to first rotation plate 51 becomes zero, and first rotation plate 51 is forcibly rotated counterclockwise by the urging force of auxiliary spring 67.

As described above, clutch operation-assisting device 70 according to the present embodiment includes push shaft 39, first rotation plate 51 and auxiliary spring 67. Push shaft 39 rotatably supports pressure plate 37, and slides in the shaft direction together with pressure plate 37. First rotation plate 51 is connected to clutch wire 43. First rotation plate 51 slides push shaft 39 by rotation in accordance with clutch wire 43. Auxiliary spring 67 changes extension direction S2 and provides the urging force that rotates first rotation plate 51 in the direction that disengages friction clutch 30, when clutch lever 9 is operated in the direction that disengages friction clutch 30, while clutch lever 9 shifts from the disengagement starting position where clutch lever 9 receives counter force of clutch spring 38 to the disengagement position where disengagement of friction clutch 30 is completed. Extension direction S2 of auxiliary spring 67 does not pass through the shaft center of push shaft 39 (rotation center of pressure plate 37), as seen from the shaft direction (sliding direction) of push shaft 39 (FIG. 5).

Therefore, according to clutch operation-assisting device 70 of the present embodiment, it is not necessary to set auxiliary spring 67 from shaft center 39a of push shaft 39 along the radius direction, so that auxiliary spring 67 can be set relatively freely without being restricted by push shaft 39. Therefore, the setting space for auxiliary spring 67 is maintained largely without enlarging crankcase 14 of power unit 13. As a result, power unit 13 can be downsized.

Since the extension space for auxiliary spring 67 is largely maintained, an extension length for auxiliary spring 67 can be set long. Therefore, without using a particularly expensive spring, sufficient urging force is attained by keeping the extension length long. Therefore, clutch operation-assisting device 70 is reduced in cost.

As shown in FIG. 5(a) and the like, clutch operation-assisting device 70 rotates around pivot shaft 65 as a center, and includes second rotation plate 52 that transmits the urging force of auxiliary spring 67 to first rotation plate 51. As seen from the shaft direction of push shaft 39, the position of pivot shaft 65 and the position of push shaft 39 are deviated.

In this way, according to clutch operation-assisting device 70, instead of directly connecting spring unit 54 and first rotation plate 51, second rotation plate 52, which provides urging force of auxiliary spring 67 to first rotation plate 51, is set between spring unit 54 and first rotation plate 51. Therefore, restriction of the setting position of auxiliary spring 67 is further reduced, and downsizing of power unit 13 is promoted.

In clutch operation-assisting device 70 according to the present embodiment, bearing member 90 that rotatably supports second rotation plate 52 is fixed to support plate 14c. Therefore, second rotation plate 52 is stably supported. Also, second rotation plate 52 can be positioned precisely when clutch operation-assisting device 70 is set. Thus, transmission of assisting force from spring unit 54 through second rotation plate 52 to first rotation plate 51 is smoothed. As a result, transmission of subtle friction force and the like to the rider's hand that grips on clutch lever 9 is restrained, so that operation of clutch lever 9 is smoothed.

According to clutch operation-assisting device 70, second rotation plate 52 is not supported by clutch cover 14b. Thus, second rotation plate 52 is rotatably supported even in a state where clutch cover 14b is removed. Therefore, it is possible to adjust clutch operation-assisting device 70 (for example, adjustment of the disengagement starting position) in a state where clutch cover 14b is removed. Therefore, maintainability of clutch operation-assisting device 70 is improved.

As shown in FIG. 3, according to clutch operation-assisting device 70, bearing member 90 supports second rotation plate 52 from the outside in the clutch shaft direction (left side in FIG. 3). First rotation plate 51 bends to the inside in the clutch shaft direction (right side in FIG. 3) at the place 51b between center part 55 and teeth 57a of gear part 57. Therefore, second rotation plate 52 can be arranged more inside. Thus, although bearing member 90 is arranged between second rotation plate 52 and clutch cover 14b, second rotation plate 52 is arranged more inside, so clutch cover 14b is restrained from protruding outside. In other words, interference between clutch cover 14b and bearing member 90 is avoided without arranging clutch cover 14b further outside.

In the present embodiment, a bearing 90a of a bearing member 90 is a ball bearing. Therefore, second rotation plate 52 is supported more smoothly, and operation of clutch lever 9 by the rider can be smoother.

In clutch operation-assisting device 70, first rotation plate 51 and second rotation plate 52 are connected in a way that a turning angle of second rotation plate 52 is larger than a turning angle of first rotation plate 51. Therefore, torque is increased when the torque is transmitted from second rotation plate 52 to first rotation plate 51, and the urging force necessary for auxiliary spring 67 is kept small. As a result, a compact spring can be used and auxiliary spring 67 is downsized or reduced in cost.

In the present embodiment, first rotation plate 51 includes a wire connection part 56 connected to clutch wire 43 and gear part 57 connected to second rotation plate 52. Wire connection part 56 and gear part 57 are located opposite from each other while having push shaft 39 in between, as seen from the shaft direction of clutch shaft 31. Therefore, according to clutch operation-assisting device 70, wire connection part 56 and gear part 57 are compactly arranged, so that downsizing of power unit 13 is promoted.

In the present embodiment, one end of auxiliary spring 67 (specifically, support end 69 of spring holder 66) is swingably supported by support plate 14c. Therefore, auxiliary spring 67 can be swung largely with the one end as a pivot. Therefore, even if auxiliary spring 67 is relatively small, sufficiently strong urging force is exerted. Support plate 14c may directly support auxiliary spring 67, or may indirectly support auxiliary spring 67 through other members.

Clutch operation-assisting device 70 according to the present embodiment includes a support plate 14c located between friction clutch 30 and first rotation plate 51. Holes 47, 48 are formed in support plate 14c. Therefore, first rotation plate 51 is firmly supported by support plate 14c, and sufficient strength is maintained. Through holes 47, 48, lubricating oil is supplied from friction clutch 30 side to the first rotation plate 51 side. Therefore, friction of the swing part of clutch operation-assisting device 70 is restrained.

According to clutch operation-assisting device 70, part of first rotation plate 51 (specifically, part of wire connection part 56) is inserted in hole 47 of support plate 14c. Furthermore, auxiliary spring 67 is inserted in hole 48 of support plate 14c. Also, part of second rotation plate 52 is inserted in hole 48. Accordingly, power unit 13 can be downsized in the width direction (shaft direction of push shaft 39, right and left direction in this embodiment) by the amount of overlap between first rotation plate 51 and support plate 14c. Also, power unit 13 can be downsized by the amount of overlap between auxiliary spring 67 and support plate 14c. Furthermore, power unit 13 can be downsized by the amount of overlap between second rotation plate 52 and support plate 14c. In the present embodiment, power unit 13 is "transversely mounted", and the width direction of power unit 13 corresponds with the vehicle width direction. Therefore, downsizing of motorcycle 1 is promoted.

According to the present embodiment, as seen from the shaft direction of push shaft 39, first hole 47 and the second hole of support plate 14c are located opposite from each other while having push shaft 39 in between. Accordingly, as compared to a case where both of holes 47, 48 are arranged on one side in a concentrated manner, rigidity of support plate 14c is enhanced.

Clutch operation-assisting device 70 in the present embodiment includes a cam mechanism of a ball cam type that slides push shaft 39 in accordance with rotation of first rotation plate 51. Specifically, clutch operation-assisting device 70 includes cam plate 41 that slides in the shaft direction together with push shaft 39. Cam plate 41 is provided with a cam surface 41b, which extends in the orthogonal direction to push shaft 39 and has a cam groove 62. On the other hand, cam groove 61 and a cam surface 51a that faces cam surface 41b of cam plate 41 are formed in first rotation plate 51. Clutch operation-assisting device 70 is arranged between cam groove 62 of cam plate 41 and cam groove 61 of first rotation plate 51, and includes ball 60 that slides cam plate 41 in the shaft direction of push shaft 39 in accordance with rotation of first rotation plate 51.

According to clutch operation-assisting device 70 in the present embodiment, first rotation plate 51 itself, which is connected to clutch wire 43, functions as a cam plate. Thus, a pair of cam plates, which constitutes a cam mechanism of a ball cam type, is not necessarily disposed separately. Therefore, downsizing of power unit 13 in the width direction can be achieved and downsizing of the vehicle is promoted.

In the present embodiment, cam plate 41 is disposed at the outside end of push shaft 39, and first rotation plate 51 is arranged more inside than cam plate 41.

According to the present embodiment, first rotation plate 51 is arranged more inside than ball 60. Therefore, downsizing of power unit 13 is promoted. Also, by arranging first rotation plate 51 more inside, second rotation plate 52 can be arranged more inside.

According to the present embodiment, first gear teeth 57a are formed in first rotation plate 51. Second gear teeth 52a, which engage with first gear teeth 57a within the surface orthogonal to push shaft 39, are formed in second rotation plate 52. That is, first rotation plate 51 and second rotation plate 52 are connected by gear.

Accordingly, first rotation plate 51 and second rotation plate 52 rotate within the same surface. Therefore, the entire length in the shaft direction of first rotation plate 51 and second rotation plate 52 is shortened. Therefore, downsizing of power unit 13 in the width direction is promoted.

First rotation plate 51 and second rotation plate 52 may be connected by a cam mechanism or the like, of course. The connection mechanism between first rotation plate 51 and second rotation plate 52 is not limited to the specific example of the present embodiment.

Downsizing of bearing member 90, which is used to support second rotation plate 52 in the present embodiment, is achieved by support by bolts 91a, 91b in relation to support plate 14c, and by forming a bearing mechanism. The rotational direction of the second rotation plate is maintained in a surface that is orthogonal to the shaft direction (pivot shaft 65) of bearing member 90. Thus, torque from the first rotation plate is transmitted accurately.

Clutch operation-assisting device 70 according to the present embodiment includes a countervailing spring 83 that provides the urging force to countervail the urging force of auxiliary spring 67 added to first rotation plate 51 when clutch lever 9 is in the returning position. Accordingly, the load required for the initial operation of clutch lever 9 is reduced, and operability of clutch lever 9 is improved.

Other Embodiments

In the embodiments described above, the clutch operation-assisting device of the present invention is applied to a motorcycle. However, the clutch operation-assisting device of the present invention can be applied to straddle type vehicles other than motorcycles.

In the embodiment described above, one part 51b of first rotation plate 51 is bent so that teeth 57a of gear part 57 are located more inside than center part 55. However, first rotation plate 51 is acceptable as long as teeth 57a of gear part 57 wind to be located more inside than center part 55. Moreover, the state of winding is not limited to a bend and can be a curve, for example.

In the present invention, the pressure "plate" is any member that press-fits the friction plate of the friction clutch and the clutch plate, and is not limited to a plate shape.

The clutch spring is not limited to a diaphragm spring, and can be another kind of spring such as a coil spring.

In the embodiment described above, push shaft 39 corresponds to the "sliding member" of the present invention. However, the sliding member is not limited to push shaft 39. Any member is acceptable as long as it rotatably supports pressure plate 37 and slides in the predetermined direction together with pressure plate 37. The sliding member may be a single member or a combination of two or more members.

In the embodiment described above, as seen from the sliding direction of the sliding member (shaft direction of push shaft 39), the rotation center of first rotation member (first rotation plate 51) and the rotation center of pressure plate 37 are the same. However, they may be deviated. For example, a seesaw-like member may be disposed between cam plate 41 and push shaft 39. Accordingly, a sliding member can be slid by rotating the first rotation member along with the transmission member. Any type of mechanism to slide the sliding member is acceptable as long as it includes the first rotation member.

A "transmission member" in the present invention is not limited to a wire shape, and may be a rod shape, for example.

An "auxiliary elastic member" in the present invention is not limited to a coil spring, and may be another elastic member such as a gas spring, for example.

In the embodiment described above, first rotation plate 51 and second rotation plate 52 are connected by gear. However, first rotation plate 51 and second rotation plate 52 may be connected by another engagement mechanism such as a link connection.

Industrial Applicability

As described above, the present invention is useful for a clutch operation-assisting device that reduces the operation force of a friction clutch, and is useful for a power unit and a straddle type vehicle including the clutch operation-assisting device.

The invention claimed is:

1. A clutch operation-assisting device disposed in a clutch operation device, and housed in a casing of a power unit, the clutch operation device including a friction clutch having a pressure plate and a clutch spring that urges the pressure plate, the friction clutch being arranged in the casing of the power unit, the clutch operation device further including an operation element that is connected to the friction clutch through a transmission member, and is manually operated against an urging force of the clutch spring when torque transmission by the friction clutch is to be disengaged, the clutch operation-assisting device comprising:

a sliding member that rotatably supports the pressure plate and slides in a predetermined direction together with the pressure plate;

a first rotation member that is connected to the transmission member and slides the sliding member by rotating along with the transmission member;

a support plate that rotatably supports the first rotation member;

an auxiliary elastic member that changes an expansion direction and provides an urging force to rotate the first rotation member in a direction that disengages the friction clutch when the operation element is operated in a direction that disengages the friction clutch, while the operation element shifts from a disengagement starting position where the operation element receives a counter force of the clutch spring to a disengagement position where disengagement of the friction clutch is completed the expansion direction of the auxiliary elastic member does not pass through a rotation center of the pressure plate, as seen from a sliding direction of the sliding member, and the expansion direction of the auxiliary elastic member being offset from the rotation center of the pressure plate in both an operated position and a return position of the operating element;

a second rotation member that is connected to the auxiliary elastic member and connected to the first rotation member at a connection position, and transmits the urging force of the auxiliary elastic member to the first rotation member by rotation; and a bearing member that is fixed to the support plate or integrally formed in the support plate, and rotatably supports the second rotation member, wherein the casing has a cover that covers the first rotation member from an outside of the clutch operation-assisting device, and further wherein a part of the first rotation member proximate the connection position bends away from the cover as the part approaches the connection position.

2. The clutch operation-assisting device according to claim 1, wherein the cover covers the support plate, the auxiliary elastic member, and the bearing member from the outside, the first rotation member has a rotation center part supported by the support plate and further having a connection part connected to the second rotation member at the connection point, the part of the first rotation member being bent such that the connection part is located more inside of the clutch operation-assisting device and further away from the cover than the rotation center part, and the bearing member supports the second rotation member from the outside.

3. The clutch operation-assisting device according to claim 1, wherein the bearing member has a ball bearing.

4. The clutch operation-assisting device according to claim 1, wherein the second rotation member has a pivot member and the bearing member receives the pivot member.

5. The clutch operation-assisting device according to claim 1, wherein the bearing member is fixed to the support plate by a fastener.

6. The clutch operation-assisting device according to claim 1, wherein the support plate and the second rotation member form a gap therebetween such that the support plate and second rotation member do not touch.

7. A power unit for a vehicle comprising:

a friction clutch having a pressure plate and a clutch spring that urges the pressure plate, wherein the friction clutch is connected through a transmission member to an operation element that is manually operated against an urging force of the clutch spring;

a sliding member that rotatably supports the pressure plate and slides in a predetermined direction together with the pressure plate;

a first rotation member that is connected to the transmission member and slides the sliding member by rotating along with the transmission member;

a support plate that rotatably supports the first rotation member;

an auxiliary elastic member that changes an expansion direction and provides an urging force to rotate the first rotation member to a direction that disengages the friction clutch, when the operation element is operated in a direction that disengages the friction clutch while the operation element shifts from a disengagement starting position where the operation element receives a counter force of the clutch spring to a disengagement position where disengagement of the friction clutch is completed the expansion direction of the auxiliary elastic member does not pass through a rotation center of the pressure plate, as seen from a sliding direction of the sliding member, the expansion direction of the auxiliary elastic member being offset from the rotation center of the pressure plate in both an operated position and a return position of the operating element;

a second rotation member that is connected to the auxiliary elastic member and connected to the first rotation member at a connection position, and transmits the urging force of the auxiliary elastic member to the first rotation member by rotation;

a bearing member that is fixed to the support plate or integrally formed in the support plate, and rotatably supports the second rotation member;

a casing that houses the friction clutch, the sliding member, the first rotation member, the support plate, the auxiliary elastic member, the second rotation member, and the bearing member, wherein a part of the first rotation member proximate the connection position bends toward the clutch as the part approaches the connection position.

8. A straddle-type vehicle comprising the power unit according to claim 7.

9. The power unit for a vehicle according to claim 7, wherein the second rotation member has a pivot member and the bearing member receives the pivot member.

10. The power unit for a vehicle according to claim 7, wherein the bearing member is fixed to the support plate by a fastener.

11. The power unit for a vehicle according to claim 7, wherein the support plate and the second rotation member form a gap therebetween such that the support plate and second rotation member do not touch.

12. The power unit for a vehicle according to claim 7, wherein the first rotation member has a rotation center part supported by the support plate and further has a connection part connected to the second rotation member at the connection point, the part of the first rotation member being bent such that the connection part is located more inside of the clutch operation device and further away from the casing than the rotation center part.

* * * * *